July 17, 1934.   P. P. BARTHELEMY ET AL   1,967,075
BRAKE PIPE CLAMP
Filed Oct. 16, 1931   3 Sheets-Sheet 1
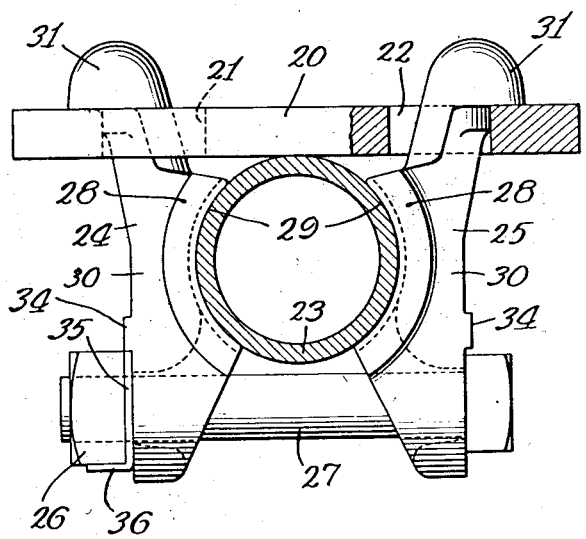
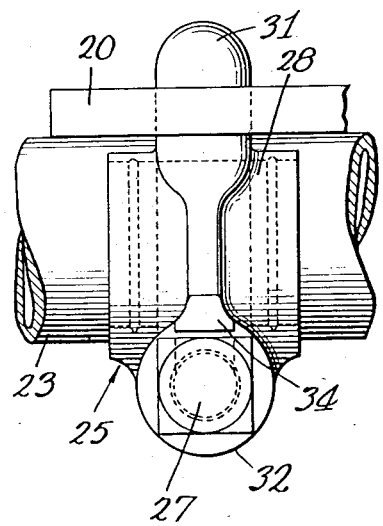
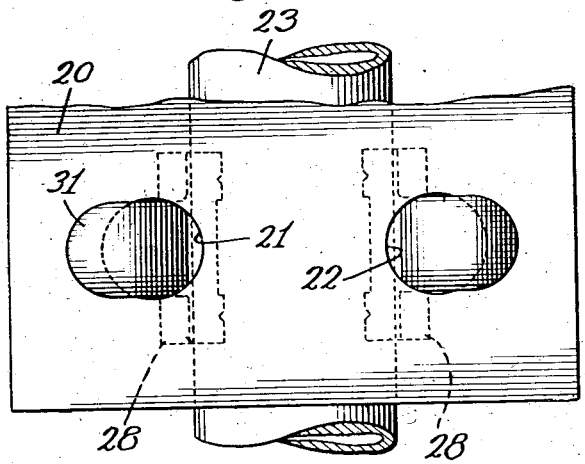
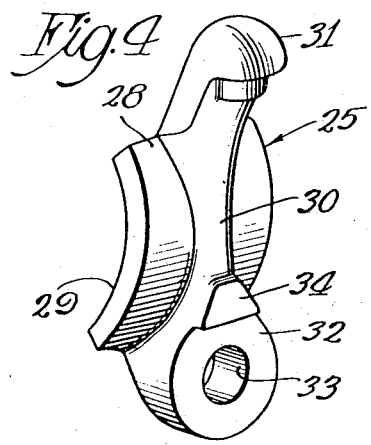
Inventors
Paul P. Barthelemy
Jack Wilson
By Gieson, Mann & Co.
Attys

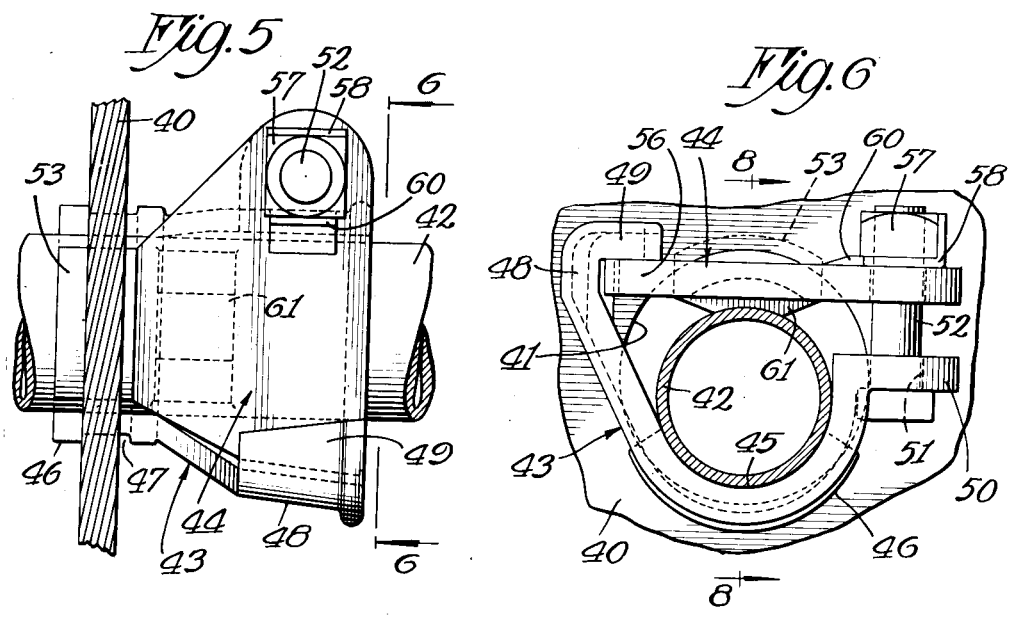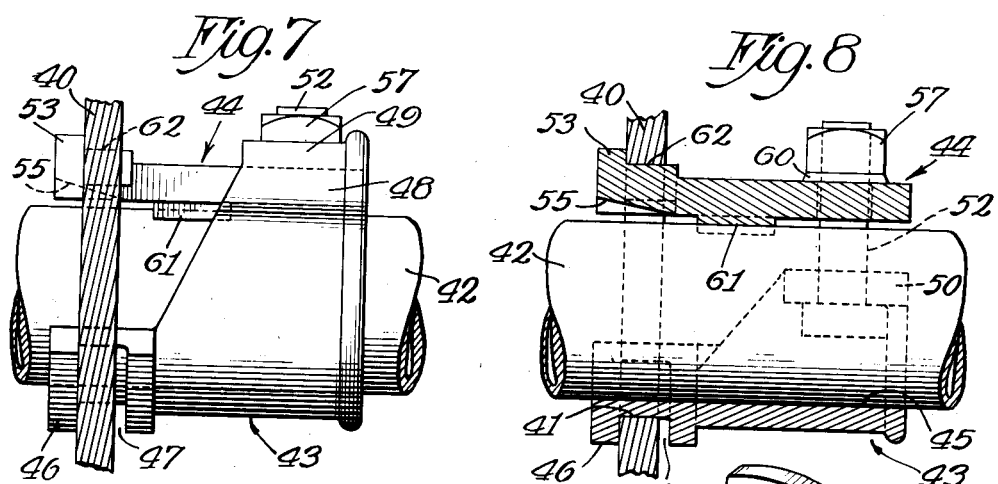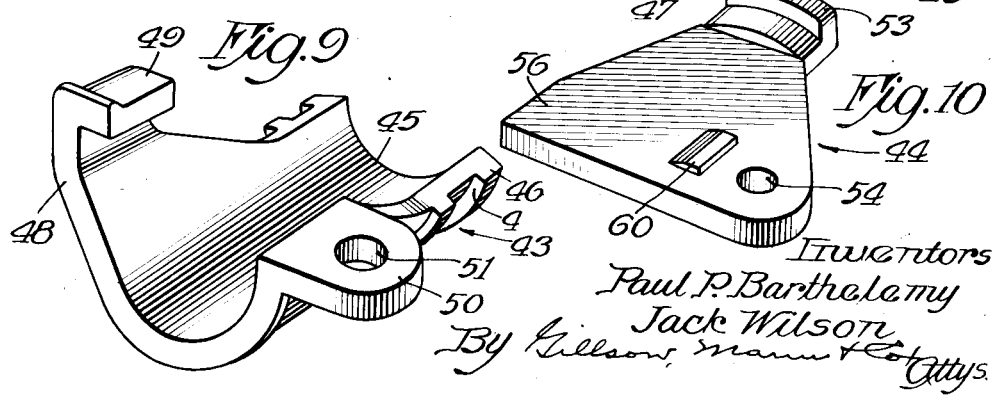

July 17, 1934. P. P. BARTHELEMY ET AL 1,967,075
BRAKE PIPE CLAMP
Filed Oct. 16, 1931 3 Sheets-Sheet 3
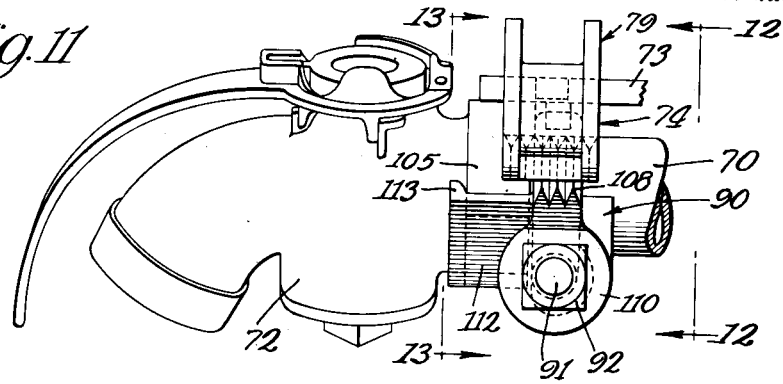
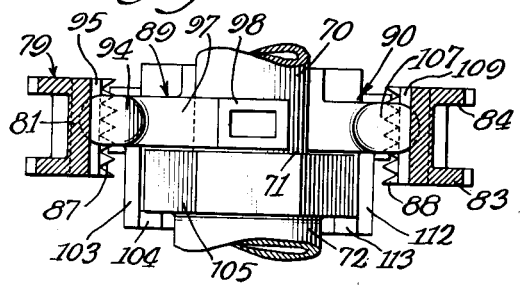
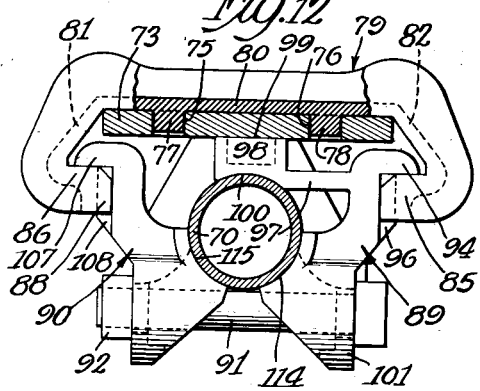
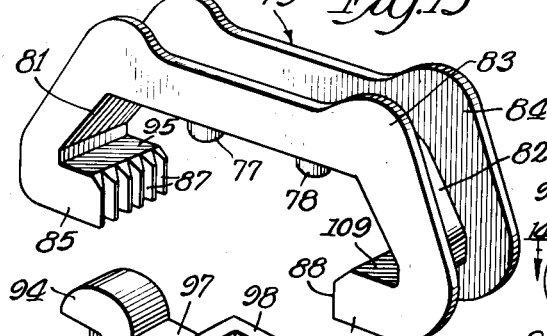
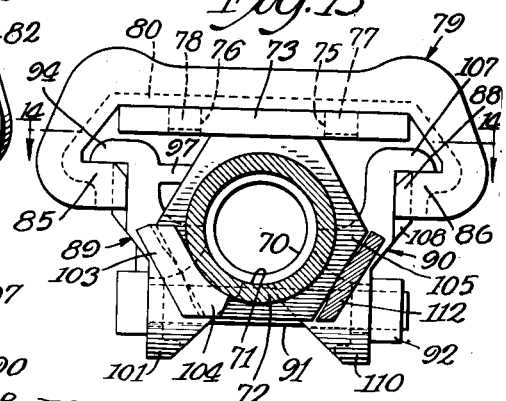
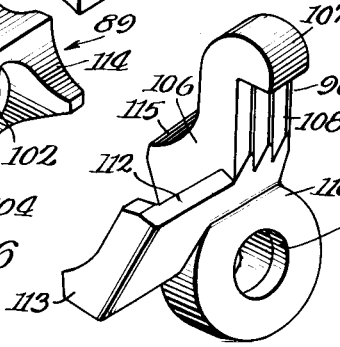
Inventors
Paul P. Barthelemy
Jack Wilson
By Gelson, Mann &ct
Attys.

Patented July 17, 1934

1,967,075

UNITED STATES PATENT OFFICE 1,967,075

BRAKE PIPE CLAMP

Paul P. Barthelemy, St. Paul, Minn., and Jack Wilson, Chicago, Ill., assignors to Universal Draft Gear Attachment Company, a corporation of Illinois Application October 16, 1931, Serial No. 569,277

4 Claims. (Cl. 248—31)

This invention relates to a device for clamping a brake pipe to the underframe of a car body.

The usual practice for supporting a brake pipe from a car underframe is to employ U-bolts straddling the brake pipe and having their threaded ends projecting through a horizontal member of the underframe, the bolts being drawn to clamping position by tightening the two nuts associated with the projecting ends of the bolt. In some instances, the pipe is supported by being passed through suitable apertures in the cross sills, but some sort of a clamp is necessary to hold the pipe against longitudinal movement, and U-bolts are commonly used for this purpose.

Difficulty has been encountered, however, in the practice above described because the U-bolts cannot be made to grip the pipe tightly enough to prevent longitudinal movement of the pipe when the brake hose is automatically uncoupled. In many cases, the strain placed upon the brake pipe has been sufficient to cause ruptures in the brake pipe line.

The principal object of the present invention is to provide a clamp which is capable of gripping the brake pipe so firmly that longitudinal movement of the pipe is virtually impossible.

Further and other objects and advantages will become apparent as the disclosure proceeds and the description is read in conjunction with the accompanying drawings, in which Fig. 1 shows a pipe clamp particularly adapted to clamp a brake pipe to a horizontal, fixed member;

Fig. 2 is a side elevational view of the same;

Fig. 3 is a plan view looking down on the fixed member;

Fig. 4 is a perspective view of one of the pipe clamps;

Fig. 5 is a plan view of another form of the invention in which the brake pipe is passed through the vertical web of some part of the underframe or of a bracket secured to the underframe, the clamps serving to simultaneously grip the pipe and the vertical web when the clamping bolt is tightened;

Fig. 6 is an elevational view of the form of the invention shown in Fig. 5 looking in the direction of the arrows 6—6 in that figure;

Fig. 7 is a front, elevational view of the same;

Fig. 8 is a sectional view taken on the line 8—8 of Fig. 6;

Fig. 9 is a perspective view of one of the clamping members;

Fig. 10 is a perspective view of the other clamping member;

Fig. 11 is an elevational view of a still further modified form of the invention particularly adapted for use as an angle cock holder;

Fig. 12 is an end elevational view of the holder looking in the direction of the arrows 12—12 in Fig. 11;

Fig. 13 is a sectional view taken on the line 13—13 of Fig. 11;

Fig. 14 is a sectional view of the holder taken on the line 14—14 in Fig. 13;

Fig. 15 is a perspective view of the yoke which is removably carried by the angle cock bracket;

Fig. 16 is a perspective view of one of the clamps of the angle cock holder; and Fig. 17 is a perspective view of the other.

But these specific illustrations and the correspondingly specific descriptions are for the purpose of disclosure only for it is realized that the clamps may be embodied in various other forms within the scope of the appended claims.

Referring now to Fig. 1, the reference character 20 designates any suitable fixed member of the car underframe, such for example as the bottom flange of a cross sill, or a portion of a special bracket secured to some part of the underframe. Assuming that the clamps are to be used on a car which has already been in service, the member 20 will be provided with apertures 21 and 22 to accommodate the standard U-bolt. If the clamp of this invention is to be used on a new car, the member 20 should be drilled to provide the apertures 21 and 22, unless the member 20 happens to comprise points of anchorage corresponding to the apertures, in which case the apertures are unnecessary.

The brake pipe 23 is supported from the relatively fixed member 20 by a pair of clamps 24 and 25 which coact with each other to firmly grip the brake pipe 23 between them when the nut 26 is screwed tightly on to the bolt 27, and at the same time to firmly press the pipe against the supporting member.

As the clamps 24 and 25 are identical, only one need be described. Referring then to Fig. 4, it will be seen that the clamp comprises a curved web portion 28, the inner surface 29 of which is of the same radius of curvature as a standard brake pipe.

The face 29 of the clamp provides a relatively large contacting surface which is important in order for the clamps to obtain a firm grip on the brake pipe.

Integral with the web portion 28 is a body portion 30, the upper portion of which is adapted to pass through the aperture provided in the fixed member 20 and firmly engage the same. To this end, the upper portion is provided with a crown 31 which rests upon the member 20 when the clamp is in its fixed position.

The lower part of the body portion 30 merges into a boss 32 which is apertured at 33 to receive the bolt 27. The outer surface of the boss 32 is squared away to provide a suitable seat for the bolt head and a protuberance 34 prevents the bolt from turning in its socket.

To apply the clamps 24 and 25 to a brake pipe, the upper ends are first passed through the apertures 21 and 22 and the crowns 31 are seated on the upper surface of the member 20. The brake pipe 23 is then positioned between the clamps so that the rounded faces 29 will engage the periphery of the brake pipe. The lower ends of the clamps are then brought together and the bolt 27 is inserted through the aperture 33 in each of the clamps. Upon tightening the nut 26 which is held away from the protuberance 34 by a lock washer 35, the clamps will act as levers of the second class and firmly grip the pipe.

After the adjustment has been made by suitably tightening the nut 26, the fingers 36 of the lock washer are bent against the nut 26 and prevent the nut from being accidentally loosened.

Referring now to Figs. 5–10 inclusive, showing a modified form of the invention, the reference character 40 designates the vertical web of a cross sill (or some other fixed member of the car underframe) provided with an aperture 41 through which the brake pipe 42 is adapted to pass. The brake pipe is held gripped to the plate 40 by a pair of clamps generally designated 43 and 44.

The clamp 43 comprises a casting which is adapted to be slipped between the brake pipe and the wall of the aperture 41 to support the pipe. The inner surface of the clamp is rounded at 45 to correspond with the curvature of the brake pipe, and the forward end of the casting is enlarged at 46 and provided with a groove 47 forming a seat for the member 40.

The rear end of the clamp is provided with an upstanding offset portion 48 terminating in a shoulder 49, the purpose of which will be later explained. Opposite the shoulder 49 is a boss 50 apertured at 51 to receive the shank of the clamping bolt 52.

The other clamp 44 comprises a more or less flat casting having its forward end merging with a rounded lug 53 adapted to engage the vertical plate 40.

Adjacent one forward corner of the casting is an aperture 54 which is in alinement with the aperture 51 of the clamp 43 when the two castings are in their operative position.

To apply the clamps to a brake pipe, the casting 43 is first placed in position around the brake pipe with the groove 47 engaging the wall of the aperture 41 of the vertical plate 40. The casting 44 is then slipped into place over the pipe, the casting being tapered at 55 to provide clearance for the lug 53. The straight edge 56 is brought under the shoulder 49 of the clamp 43, as shown most clearly in Fig. 6 and the bolt 52 is then inserted through the apertures 51 and 54. A nut 57 screws on to the bolt, and the lock washer 58 having a straight edge 59 abutting a protuberance 60 cast on the clamp 44 securely locks the nut in adjustment.

The underside of the casting 44 is provided with a pipe engaging lug 61 which serves to grip the pipe when the nut 57 is screwed down on the bolt 52.

The shape of the clamps and their arrangement provide an unusually effective way of clamping the pipe to a vertical member of the car underframe. As the two clamps are drawn together by advancing the nut 57 on the bolt, the shoulder 49 acts as a fulcrum as the clamps are brought into firm engagement with the pipe 42. At the same time, the lug 61 of the clamp 44 is pressed against the pipe with a mechanical advantage brought about by the lever action of the clamp 44 having its fulcrum at 62.

It will be seen that the principle underlying the function of the pipe clamp shown in Figs. 5–10 is identical with the action of the pipe clamp shown in Figs. 1–4 inclusive. In each case, the pipe clamps have portions engaging a fixed member of the car underframe and other portions engaging the brake pipe, the clamping action being accomplished by drawing together still other portions of the clamps in such a manner that the clamps act as levers in simultaneously gripping the fixed member and the brake pipe. Furthermore, it will be noted that relatively large contacting surfaces are provided on the clamps.

Coming now to Figs. 11–17 inclusive in which the present invention is shown adapted to be used as an angle cock holder, the brake pipe is indicated at 70 having a screw threaded connection 71 with an angle cock 72, the brake pipe and angle cock being supported from an angle cock bracket 73 by a holder generally designated 74.

The angle cock bracket 73, if standard, is already provided with apertures 75 and 76 in order to receive the ends of the customary U-bolt used for supporting the angle cock and pipe. These apertures are adapted to receive depending lugs 77 and 78 of a yoke generally designated 79, which comprises a casting having a horizontal web 80 and inclined webs 81 and 82, all of which are reinforced by vertical ribs 83 and 84.

The inclined webs 81 and 82 and the reinforcing ribs merge with horizontal, inwardly projecting shoulders 85 and 86, the inner faces of which are provided with a plurality of ratchet teeth 87 and 88, respectively. The yoke, as will be seen, is adapted to be removably seated on the angle cock bracket 73.

Cooperating with the yoke 79 are a pair of clamps, generally designated 89 and 90, which are adapted to firmly grip the brake pipe when their lower ends are drawn together by a bolt 91 equipped with a nut 92.

The clamp 89 comprises a casting having a body portion 93 terminating at its upper end in a crown 94 adapted to rest upon the upper surface 95 of the yoke shoulder 85 when the parts are in their operative positions. Directly beneath the crown 94 are a plurality of ratchet teeth 96 which are adapted to coact with the teeth 87 to hold the clamp against longitudinal movement. The clamp has an integrally cast, inwardly extending arm 97 carrying a lug 98, the upper surface of which bears against the angle cock bracket 73 at 99 (Fig. 12) and the lower surface of the lug being curved to engage the top of the brake pipe as shown at 100 (Fig. 12).

The lower portion of the clamp 89 is enlarged at 101, and apertured at 102 to receive the clamping bolt 91. Adjacent the enlargement is a flange 103 provided with a retaining shoulder 104 which is adapted to engage one face of the hexagonal enlargement 105 on the angle cock and prevent the angle cock from turning relatively to the brake pipe.

The other clamp 90 comprises a body portion 106 likewise provided with a crown 107 and ratchet teeth 108 adapted to coact with the upper face 109 and ratchet teeth 88, respectively, of the yoke shoulder 86. The clamp has a boss 110 at its base apertured at 111 to receive the other end of the bolt 91. The clamp 90 is provided with a flange 112 and retaining shoulder 113 similar to the flange 103 and shoulder 104 of the clamp 89, for a like purpose.

In applying the holder to the car body, the yoke 79 is first seated on the angle cock bracket 73 with the lugs 77 and 78 engaging the apertures 75 and 76 respectively in the angle bracket. The clamp 89 is then placed in position with the lug 98 interposed between the bracket 73 and the brake pipe 70 and with the crown 94 resting upon the ledge 95 of the yoke shoulder 85. The clamp 90 is then brought into position with its crown 107 resting upon the ledge 109 of the shoulder 86. The relatively large curved surfaces 114 and 115 of the clamps 89 and 90, respectively, are brought against the under side of the brake pipe, the bolt 91 is inserted through the apertures 102 and 111, and the nut 92 applied to the bolt.

Upon screwing the nut 92 tightly on the bolt, the brake pipe and angle cock will be firmly braced and held against longitudinal movement, and at the same time, the flanges 103 and 112 of the clamps 88 and 89, respectively, will hold the angle cock against turning. The holder therefore serves to materially strengthen the angle cock joint and prevents breakage of the pipe at that point.

Although the angle cock holder above described differs considerably in appearance from the forms of the invention shown in Figs. 1 through 10 inclusive, it will nevertheless be seen that the underlying principle of each is the same for all three forms, viz. a pair of clamps are so arranged with respect to the brake pipe and the supporting member that by drawing together two adjacent portions of the clamps, preferably by a single bolt, the support and brake pipe are simultaneously gripped.

What we claim, therefore, is:—

1. In combination with a support having an opening through which a pipe extends, a pair of clamping members adapted to be interposed between the pipe and the wall of the opening to secure the pipe to the support, spaced flanges on the members for engaging opposite sides of the support, but permitting limited relative movement, and means including a bearing lug for drawing adjacent parts of the members together and cause them to simultaneously grip the pipe and the support, all of the surfaces of the support and members which contact with each other being substantially parallel to the axis of the pipe so that the pipe and members may be moved in either direction a distance limited by the spacing of the flanges without materially affecting the clamping of the members to the pipe.

2. In combination with a support having an opening through which a pipe extends, a pair of clamping members adapted to be interposed between the pipe and the wall of the opening to secure the pipe to the support, a bearing lug on the inner face of one of the members, and means for drawing adjacent parts of the members together whereby the lug acts as a fulcrum to simultaneously cause the members to grip the support and the pipe.

3. In combination with a support having an opening through which a pipe extends, a pair of clamping members adapted to be interposed between the pipe and the wall of the opening to secure the pipe to the support, a shoulder on one of the members engageable on one side of the pipe with a portion of the other member, means for drawing the members together on the opposite side of the pipe, and a bearing lug on the inner face of one of the members positioned intermediate the support and the shoulder whereby the drawing together of the members by said means causes the portion of said members between the pipe and the support to be spread apart to engage the wall of the opening.

4. In combination with a support having an opening through which a pipe extends, a pair of clamping members having portions interposed between the pipe and the wall of the opening and portions projecting away from the opening, a bearing lug on the inner face of the projecting portion of one of the members, and means for drawing together portions of the members still more remote from the opening whereby the lug serves as a fulcrum to cause the pipe and the support to be simultaneously gripped by the members.

PAUL P. BARTHELEMY.
JACK WILSON.